(12) United States Patent
Rex et al.

(10) Patent No.: US 6,843,514 B2
(45) Date of Patent: Jan. 18, 2005

(54) PIPE COUPLING DEVICE

(75) Inventors: Brian Rex, Hertfordshire (GB); Mark Adrian Beevor, Hertfordshire (GB)

(73) Assignee: Glynwed Pipe Systems Ltd., Birmingham (GB)

( * ) Notice: Subject to any disclaimer, the term of this patent is extended or adjusted under 35 U.S.C. 154(b) by 31 days.

(21) Appl. No.: 10/319,152

(22) Filed: Dec. 13, 2002

(65) Prior Publication Data

US 2003/0085566 A1 May 8, 2003

Related U.S. Application Data

(63) Continuation of application No. PCT/GB01/02615, filed on Jun. 13, 2001.

(30) Foreign Application Priority Data

Jun. 13, 2000 (GB) ................................................ 14343

(51) Int. Cl.⁷ ............................................... F16L 19/06
(52) U.S. Cl. ....................... 285/341; 285/339; 285/343; 285/421; 285/323
(58) Field of Search ................................ 285/339, 337, 285/341, 342, 343, 421, 23, 323

(56) References Cited

U.S. PATENT DOCUMENTS

| 2,989,326 | A | * | 6/1961 | Seward et al. ................. 403/12 |
| 4,119,335 | A | * | 10/1978 | Rieffle et al. ................. 285/337 |
| 4,235,461 | A | * | 11/1980 | Normark .................... 285/340 |
| 4,569,542 | A | * | 2/1986 | Anderson et al. ........... 285/337 |
| 5,188,401 | A | * | 2/1993 | Staniforth .................... 285/322 |
| 5,297,826 | A | | 3/1994 | Percebois et al. ........... 285/232 |
| 5,803,513 | A | * | 9/1998 | Richardson .................. 285/342 |
| 6,086,111 | A | * | 7/2000 | Harper ........................ 285/55 |
| 6,106,029 | A | * | 8/2000 | DeMore et al. ............. 285/322 |
| 6,257,628 | B1 | * | 7/2001 | Nijsen ........................ 285/323 |
| 6,533,331 | B2 | * | 3/2003 | Hulsebos et al. ........... 285/323 |

FOREIGN PATENT DOCUMENTS

| EP | 0 794 378 A2 | 9/1997 |
| EP | 0 974 780 A1 | 1/2000 |
| GB | 2 167 145 A | 5/1986 |
| GB | 2 227 067 A | 7/1990 |

* cited by examiner

*Primary Examiner*—David Bochna
(74) *Attorney, Agent, or Firm*—Heslin Rothenberg Farley & Mesiti P.C.

(57) ABSTRACT

A pipe coupling device (2) for joining the ends of two pipes is disclosed. The pipe coupling device (2) includes a sleeve (4) configured to receive an end of a pipe and having an annular first abutment surface (6); a compression member (12) having an annular second abutment surface (10); a sealing and gripping assembly (8) for sealing against and gripping the pipe; and threaded fasteners for drawing the compression member (12) and the sleeve (4) axially together so as to compress the sealing and gripping assembly (8) against the pipe. The sealing and gripping assembly (8) includes a sealing member (14) and a gripping device. The gripping device may include an annular carrier (16) having an annular recess for retaining a gripping member (18). The gripping surface of the gripping member (18) and the annular carrier (16) are adapted for relative axial movement wherein the gripping member (18) may be moved into tighter contact with the pipe.

20 Claims, 6 Drawing Sheets

PIPE COUPLING DEVICE

CROSS REFERENCE TO RELATED APPLICATIONS

This application is a continuation of PCT application PCT/GB01/02615 filed on 13 Jun. 2001, which claims priority from British application GB 0014343.8 filed on 13 Jun. 2000. The disclosures of these applications are incorporated by reference herein.

FIELD OF THE INVENTION

The present invention relates to a device for coupling to a pipe. In particular, the invention relates to a pipe coupling device which grips and seals pipes with a range of outer diameters.

BACKGROUND OF THE INVENTION

The expression "pipe" as used herein is intended to include pipes and tubes as such, and also pipe-like members and fittings for use in pipework such as bends, elbows, "T" connectors, flange adaptors and parts and devices adapted to be fitted to pipework such as valves and pumps. Such pipes may have a variety offend configurations, and will be plain-ended in contrast to flange-ended.

Pipe coupling devices commonly comprise an annular coupling sleeve that can connect with a plain-ended pipe. The connection can be made via a sealing or gripping member such as a sealing gasket arranged about the plain-ended pipe, and an annular compression member disposed about the end of the sleeve and arranged to be drawn axially against the sealing or gripping member to cause the said member to be forced radially inwardly into sealing contact between the sleeve member and the outer periphery of the plain-ended pipe located within the sleeve. The sleeve and/or the annular compression member are typically provided with radially inclined annular surfaces to assist deformation of the sealing or gripping member in a radially inwards direction.

Such pipe couplings can be formed, for example, of malleable iron, steel or plastics material, the gaskets being formed of an appropriate elastomeric material.

The compression member can be in the form of a compression flange the compression flange being provided with tightening nuts and bolts for connecting together the compression flange with a flange or similar formation on, or associated with, the coupling sleeve. The tightening bolts pass through apertures spaced around the outer extremeties of the respective flanges, such bolts being provided with a head at one end and carrying a nut at the other so that the flanges are drawn together by tightening the nuts and bolts. Alternatively, the compression member may be threaded to enable it to screw into or onto the ends of the sleeve.

One problem confronting manufacturers of pipe couplings is that for pipes having a given nominal outside diameter (O.D.), the pipes in practice may have O.D.s varying over quite a wide range. Thus, couplings need to be capable of being used to connect pipes having a range of O.D.s.

In many known coupling devices, the annular compression member (e.g. compression flange), and the opposing portion of the sleeve against which the sealing or gripping member (e.g. sealing gasket) is compressed, have inclined surfaces, the angles of inclination serving to assist the gasket to be deformed radially inwardly.

In such coupling devices, the sealing or gripping efficiency of the gasket, and/or any gripping element associated therewith is dependent on the input loads exerted as the two inclined surfaces of the sleeve and compression member are drawn towards each other, and by the angle that at least one of the inclined surfaces makes with the pipe.

On pipe couplings manufactured for pipes of set dimensions, i.e. pipes manufactured to very close tolerances with little variation in O.D., the inclined surface(s) usually has a shallow taper or angle. When the axial load is applied by drawing two inclined surfaces together, which in most cases comprises tightening a nut and bolt connecting a pair of flanges extending radially outwardly from the inclined surfaces, either side of a gripping or sealing ring, the shallow taper helps to improve the gripping force.

However, when such a shallow angle is used on pipe couplers intended for use on a wide range of pipe diameters, a much greater range of axial movement may be required to produce the necessary radial inward movement of the gasket and, for example, the bolt length needed to impart pressure to and reduce the diameter of a sealing or gripping gasket by, e.g. 35 mm, is considerable.

To overcome this problem, the taper of the support surface can be steepened, but a drawback here is the initial requirement for a much greater force to be imparted by the bolt to create an efficient grip; moreover, the gripping force is not significantly further enhanced by the angle.

One known coupling device intended for use with a wide range of pipe O.D.s is disclosed in EP-A-0 794 378. In EP-A-0 794 378, there is disclosed a device comprising a sealing/gripping member which includes a substantially closed gripping ring comprising a plurality of slidably abutting elements and a pair of inclined support surfaces which can be moved axially towards each other, thereby pressing the elements radially inwardly against the pipe. The slidably abutting elements taper in a radial inwards direction and act in the manner of a camera iris when compressed. The radial contraction of the gripping ring is thus provided by virtue of the abutting elements sliding over one another and rotating such that the tapered inner edges of the elements become more radially aligned.

A development of the device shown of EP-A-0 794 378 is disclosed in EP-A-0 974 780. In EP-A-0 974 780, the gripping action is provided by a separate gripping ring held within a recess on the radially inner surface of the slidably abutting elements. The gripping ring, which would appear not to be axially moveable with respect to the slidably abutting elements, is described as being formed from spring steel and having gripping teeth pressed out of the plane of the ring.

Another known coupling device is disclosed in GB-A-2 227 067. This document discloses a coupling in which a gripping and sealing assembly comprises an annular sealing gasket, a metal force transmitting ring and a gripping ring. The gripping ring is formed from an array of circumferentially linked elements.

An object of the present invention is to provide an improved pipe coupling capable of being used with pipes having a wide range of ODs for a given nominal OD.

A further object of the invention is to provide a pipe coupling in which a firm gripping force can be applied to a pipe over a wide range of pipe ODs to prevent retraction of the pipe from the coupling under end loads.

SUMMARY OF THE INVENTION

Accordingly, in a first aspect, the invention provides a pipe coupling device comprising:

a sleeve having an end configured to receive therein a plain end of a pipe and being provided with an annular first abutment surface;

a compression member arranged to encircle the pipe and having an annular second abutment surface;

a sealing and gripping assembly for sealing against and gripping the pipe; and means for drawing the compression member and the sleeve axially together so as to compress the sealing and gripping assembly between the first and second abutment surfaces thereby to deform or move the sealing and gripping assembly radially inwardly and into sealing and gripping engagement with the pipe;

the sealing and gripping assembly comprising a sealing member and a gripping means, the gripping means comprising a radially contractable annular carrier, the radially contractable annular carrier having an annular recess on a radially inner side thereof, a gripping member being disposed within the annular recess, a gripping surface of the gripping member and the annular carrier being arranged for relative axial movement; the gripping member and annular recess being configured such that in response to axial outwards movement of the pipe, the gripping surface of the gripping member is moved radially inwardly and into tighter gripping contact with the pipe.

The annular carrier is preferably formed from a plurality of linked elements.

In one preferred embodiment the invention provides a pipe coupling device comprising:

a sleeve having an end configured to receive therein a plain end of a pipe and being provided with an annular first abutment surface;

a compression member arranged to encircle the pipe and having an annular second abutment surface;

a sealing and gripping assembly for sealing against and gripping the pipe; and means for drawing the compression member and the sleeve axially together so as to compress the sealing and gripping assembly between the first and second abutment surfaces thereby to deform or move the sealing and gripping assembly radially inwardly and into sealing and gripping engagement with the pipe;

the sealing and gripping assembly comprising a sealing member and a gripping means, the gripping means comprising an annular carrier formed from a plurality of linked elements which, when subjected to radial compression, move closer together in a circumferential direction, the elements each having a recess on a radially inner surface thereof, the recesses together defining an annular recess on a radially inner side of the annular carrier, a gripping member being disposed within the annular recess, a gripping surface of the gripping member and the annular carrier being arranged for relative axial movement; the gripping member and annular recess being configured such that in response to axial outwards movement of the pipe, the gripping surface of the gripping member is moved radially inwardly and into tighter gripping contact with the pipe.

The gripping surface of the gripping member and the annular carrier are arranged for relative axial movement; the gripping member and annular recess being configured such that in response to axial outwards movement of the pipe, the gripping surface of the gripping member is moved radially inwardly and into tighter gripping contact with the pipe. Thus the gripping surface of the gripping member is arranged to grip the pipe more tightly in response to forces acting to retract the pipe from the coupling sleeve. In this way, the coupling of the invention is able to resist end loads and can prevent the pipe from being pulled out of the coupling.

The mechanism by which the gripping surface is urged radially inwardly against the pipe as a retractive end load is applied to the pipe can vary. For example, the gripping member can take the form of a grab ring, e.g. a frustoconical grab ring, a radially outer edge of the grab ring being held against movement by the configuration of the recess in the annular carrier, and a radially inner edge being pivotable about the outer edge such that it digs further in to the pipe as the pipe is subjected to retractive forces. However, it is preferred that the recess in the annular carrier is configured to provide an annular camming surface that cams against a radially outer surface of the gripping member to urge the gripping member radially inwardly against the pipe. In a currently most preferred embodiment, the gripping member is substantially wedge-shaped and the annular recess presents a ramped surface that cams along a radially outer inclined surface of the wedge shape of the gripping member to force the gripping member radially inwardly against the pipe.

The gripping member is typically formed from a plastics material, although it can be formed from other materials such as metals. The gripping surface is preferably provided with serrations, ridges or other grip-enhancing protrusions. In order to further enhance the effectiveness of the grip exerted on the pipe, the gripping surface is preferably provided with grip-enhancing means having a greater hardness than the hardness of the main body of the gripping member itself. For example, the gripping surface can have disposed therein or thereon one or more metallic gripping studs or protrusions, or can have embedded in the surface thereof, or coated thereon an abrasive material, for example an abrasive material having a Mohs scale hardness of greater than 9.0, preferably a material such as carborundum (silicon carbide) having a Mohs scale hardness of at least about 9.5.

The grip-enhancing means can be moulded into the gripping members during manufacture, or they can be secured in or to the gripping surface after manufacture. For example, they can be adhesively bonded to the gripping surface.

The gripping member can be of annular or part annular configuration and may be arranged continuously or discontinuously about the pipe. For example, the gripping member may comprise a plurality, e.g. two, three, four, five or six members arranged circumferentially around the pipe. The gripping members can be segmented, and may be arranged so that each segment cooperates with one of a plurality of linked elements making up the annular carrier. The segments are typically hingedly linked to enable the gripping member to conform to the radius of the pipe. Alternatively, the gripping member can comprise a plurality of discrete individual gripping members, each adapted to cooperate with one linked element of the annular carrier. Where individual gripping members are provided for each linked element, the gripping members can be linked in such a manner that the gaps between the griping members can be varied as the circumference of the annular support changes during use. Thus, for example, the gripping members can be connected together in a similar manner to the elements.

The gripping member and the annular recess are preferably provided with cooperating retention means for preventing accidental dislodgement of the gripping member. Thus, for example, the gripping member or the annular recess may be configured to present one or more cooperating protrusions and recesses. The annular recess may advantageously be configured so as to provide a groove for receiving a protrusion (e.g. a stalk-like or tongue-like projection) on the gripping member. The groove and protrusion are configured such that the gripping member is held firmly in place during carriage and installation, but the resistance to disengagement is sufficiently low to permit the gripping member to move upon application of a retractive end load on the pipe.

In one preferred embodiment, the annular carrier of the gripping means is formed from a plurality of linked elements and the linked elements are configured such that they are not in fully abutting relationship prior to compression but rather are circumferentially spaced apart Typically, the elements may have surfaces between the radially inner edges of which there is a circumferential gap of up to about 10 mm, more usually less than 8 mm, for example 4–6 mm prior to compression. After compression and radial contraction, the gaps between the said radially inner edges of the surfaces of the elements can be reduced by up to 100%, for example up to 90%, depending on the actual diameter of the pipe relative to its nominal size. In order to prevent extrusion of the sealing member through the circumferential gaps between the surfaces of the elements, the elements are preferably provided with overlapping or interdigitating projections that serve to cover or at least reduce the gaps. For example, an element may be provided with a projection such as a tongue or tab on one side thereof that overlaps with a mating recess on another element. In the uncompressed state, the projections are sufficient to conceal the gap and, as the annular carrier is compressed and the circumferential gaps are reduced, the projections and recesses on adjacent elements slide into overlapping relationship. Alternatively, or additionally, the elements can be provided with interdigitating projections that conceal the circumferential gaps and which are urged together into overlapping relationship as the annular carrier is compressed.

The linked elements are preferably provided with means for securing them together in an uncompressed state. More preferably, the elements are provided with first and second detent positions, a first detent position serving to hold the elements together and to being sufficient to prevent inadvertent compression during transit or routine handling, and a second detent position to which the elements can be compressed during use.

The linked elements can advantageously be linked together by a male and female type connection such as a ball and socket or tongue and groove arrangement. Preferably each element has a male element and a female element, but it is possible for alternating elements to have only male elements or only female elements, although this is less preferred. Where a male and female arrangement is provided, the female element and/or the male element may have interengaging ribs, recesses or other protrusions that function as detents, for example to provide at least two detent positions as hereinbefore defined.

The elements are typically hingedly linked to enable them to conform to the diameter of the pipe. Thus, for example, where a tongue and groove arrangement or a ball and socket arrangement are employed, the tongue or ball can be configured so as to be pivotable in the groove or socket. Accordingly, the tongue may have a rounded bulbous edge to allow it to pivot freely.

The sealing member is typically formed from a suitable elastomeric material such as a natural or synthetic rubber, numerous examples of which are known to the skilled person and which do not require discussion here. The sealing member preferably has means for securing it to the gripping means. For example, the sealing member may have a lip or other protrusion that can be held in a suitably configured groove or recess in the annular carrier. Such a recess or groove can be provided with detent means such as ribs to assist retention of the lip or protrusion.

In order to allow the user to establish easily whether the gripping member has been installed in the annular carrier, it may be provided with "signal means" such as, for example, a tab or other visually identifiable element and/or by means of colour coding.

In a further aspect, the invention provides a combination of a pipe coupling device as defined hereinabove and a pipe.

In still a further aspect, the invention provides a method for coupling the end of a pipe to a pipe coupling device, comprising the steps of:

(a) placing a sleeve of a pipe coupling device as defined hereinabove over the end of a pipe;

(b) drawing the compression member and the annular sleeve axially together so as to compress the gripping means between the first and second abutment surfaces so as to deform or move the gripping means radially inwardly and into sealing and gripping engagement with the pipe.

In yet a further aspect, the invention provides a sealing and gripping assembly as hereinbefore defined.

The invention will now be illustrated, but not limited, by reference to the following diagrammatic drawings, in which:

DETAILED DESCRIPTION OF THE PREFERRED EMBODIMENTS

Figure 1:
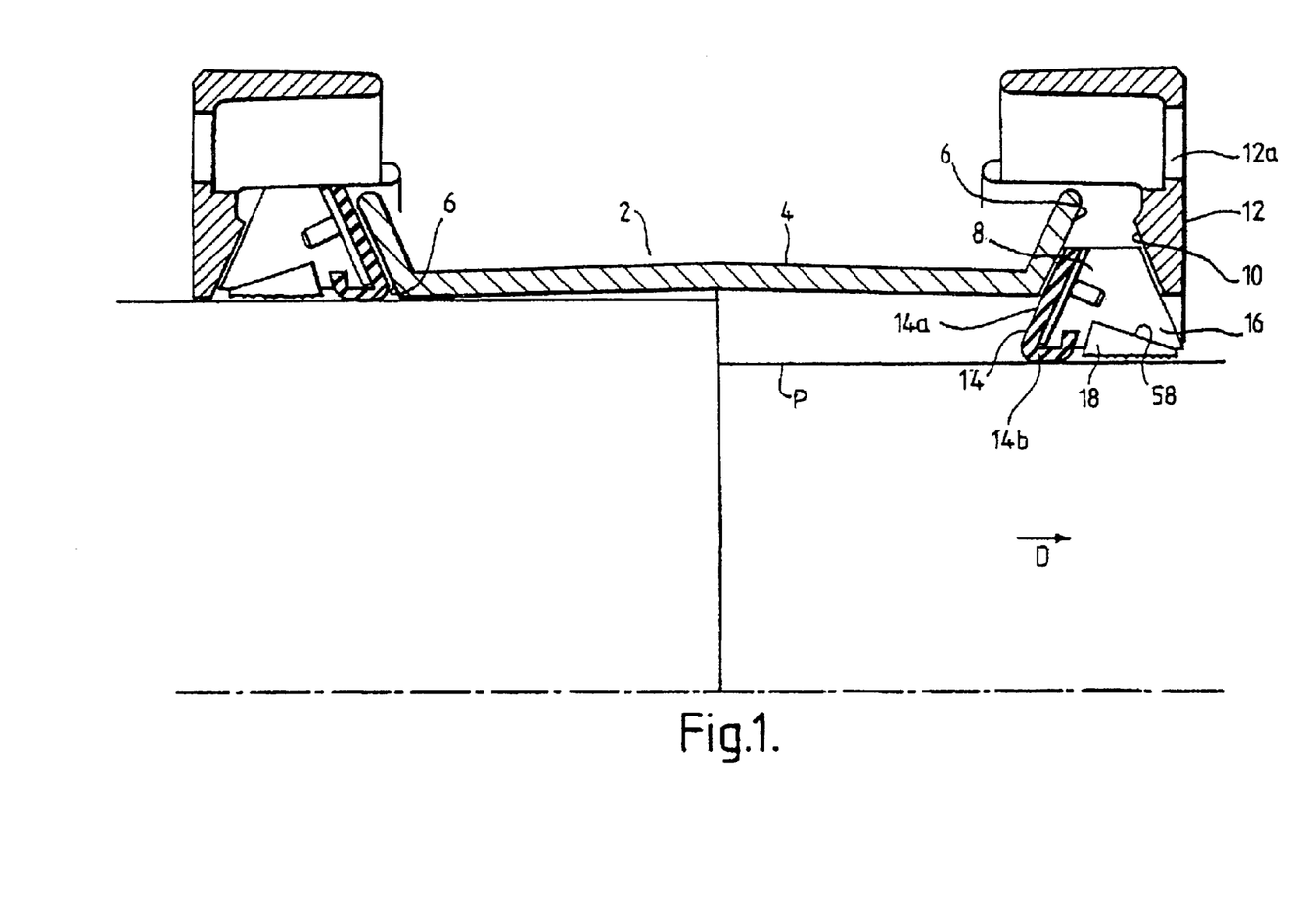
FIG. 1 is a partial side sectional elevation through a pipe joint according to one embodiment of the invention.
Figure 2:
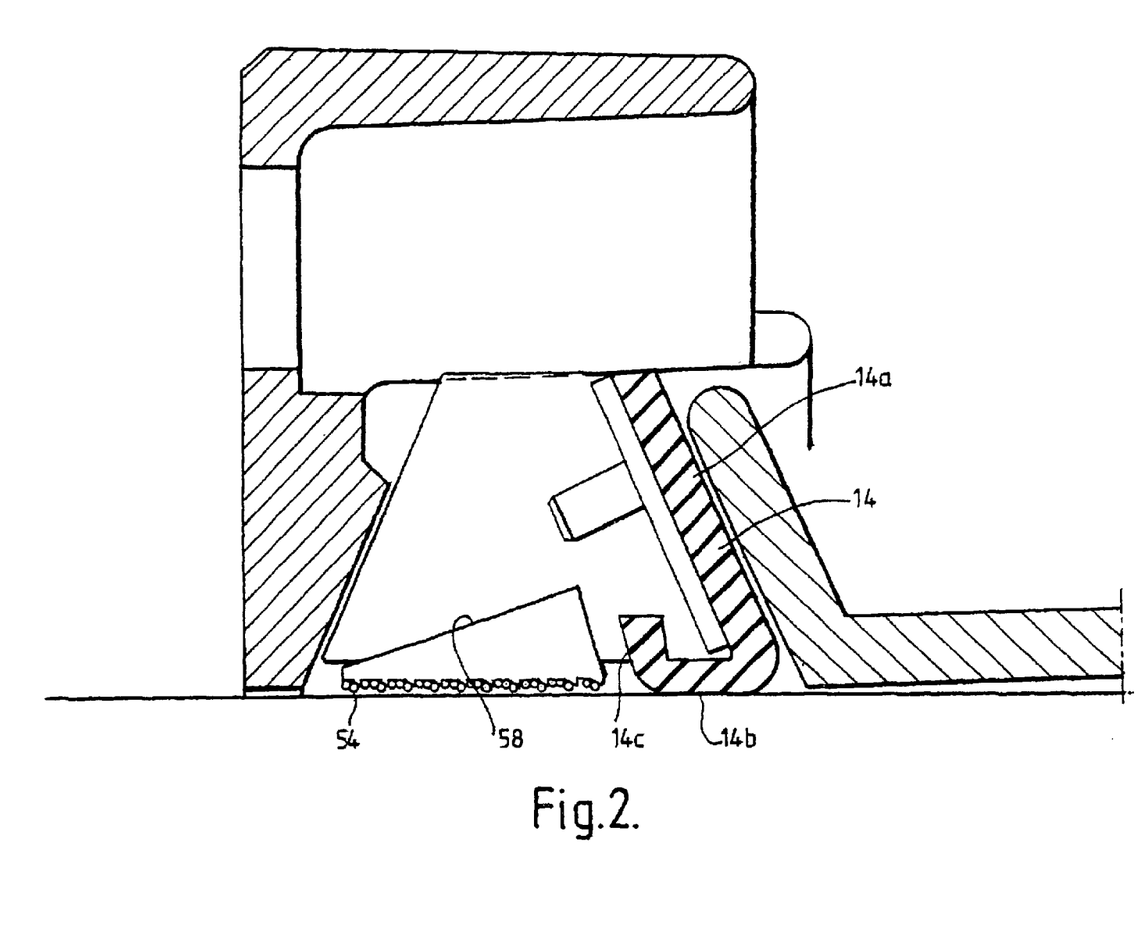
FIG. 2 is an enlarged view of one end of the arrangement shown in FIG. 1.

Referring now to the drawings, a pipe coupling device 2 according to one embodiment of the present invention includes a generally cylindrical sleeve 4, which in this embodiment has been cast from ductile iron, although it could alternatively be fabricated from steel, for example by forming a cylindrical blank from a blank strip and then deforming the cylindrical blank to the desired shape.

At each end, the sleeve 4 is provided with an inclined annular first abutment surface 6. A sealing and gripping assembly 8 is situated between the first abutment surface 6 and a second abutment surface 10 of a compression flange 12. Flange bolts (not shown) pass through apertures 12a in the compression flanges and provide a means of drawings the compression flanges together.

The sealing and gripping assembly 8 comprises a gasket 14 formed from a suitable elastomeric material, an annular member 16 (corresponding to the "annular carrier" of the claims) and a gripping member 18. The annular member 16 (annular carrier) is formed from a plurality of linked elements 20 formed from a moulded plastics material. The structure of the elements is shown in more detail in FIGS. 3 to 7.

Figure 3:
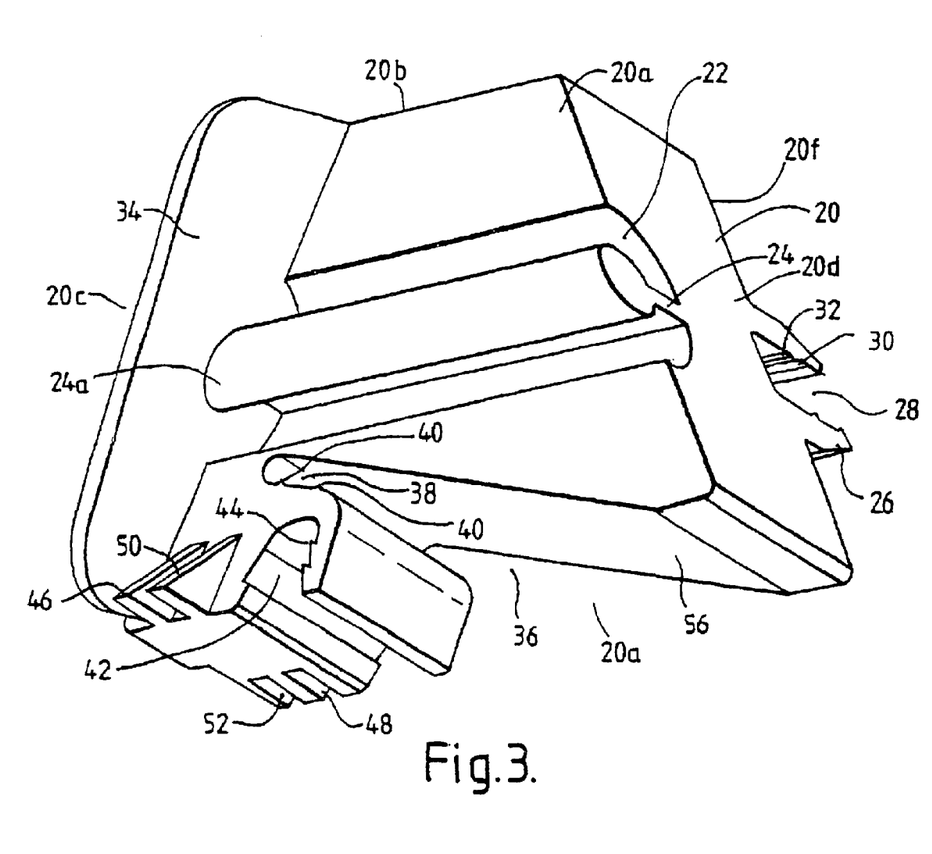
FIG. 3 is an isometric view of an individual element from which the annular carrier of the gripping means is formed.

As can best be seen from FIG. 3, each element 20 has a radially inner side 20a, a radially outer side 20b, an axially inner side 20c, an axially outer side 20d, and circumferentially facing sides 20e and 20f.

Circumferentially facing side 20e in this embodiment has a generally hemi-cylindrical groove 22 extending from which is a tongue 24 having a bulbous portion 24a. On the opposing circumferentially facing side 20f, a pair of projecting walls 26 define a groove 28 into which the tongue 24 of an adjacent element 20 can be fitted to link two elements together. Detent ridges 30 and 32 provide a means of retaining the tongue in the groove and, together with the bulbous portion of the tongue 24, constitute a snap-fit connecting mechanism. The bulbous portion 24a of the tongue has a rounded surface (typically circular in cross section) and this enables the tongue to 24 to pivot in the groove 28 and thus accommodate pipe curvatures of different radii.

The axially inner surface of the element 20 has a tab portion 34 extending therefrom. Located behind the tab portion 34 is a recess corresponding in depth to the thickness of the tab portion 34 and configured so as to be capable of accepting the tab portion of an adjacent element. The overlapping tab portions 34 and complementary recesses serve to cover any gaps between the elements and thereby prevent the gasket 14 from extruding between the elements under compression.

The radially inner side of the element has a generally triangular recess 36 formed therein, the recess extending into a slot 38, the side walls of which are provided with gripping ridges 40. Also set into the radially inner side of the element is a slot 42, the walls of which are provided with gripping ridges 44.

Figures 5, 7:
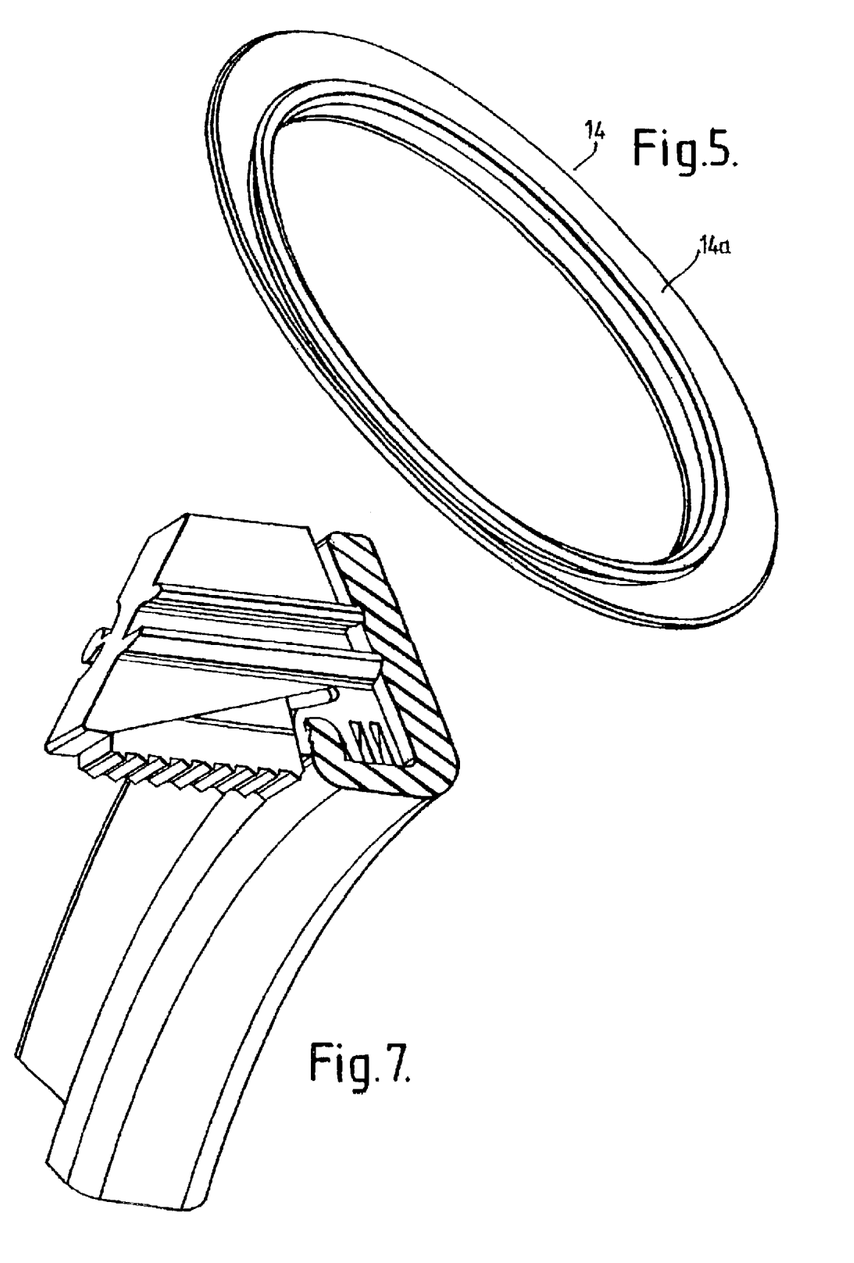
FIG. 5 is an isometric view of a sealing gasket.
FIG. 7 is a partially sectioned isometric view of the sealing and gripping means when assembled.

The sealing gasket 14 has an inclined portion 14a which sits between the first abutment surface 6 of the sleeve, and the axially inner sides of the element; and a generally cylindrical portion 14b which sits between the radially inner side of the element 20 and the pipe. A short radially outwardly orientated lip 14c is retained within slot 42, gripping ridges 44 serving to assist in anchoring the gasket securely in place.

As indicated above, the overlapping tab portions 34 and complementary recesses on the axially inner side of the elements serve to cover any gaps between the elements and thereby prevent the gasket 14 from extruding between the elements under compression. In order to prevent extrusion of the cylindrical portion 14b between the elements under compression, the circumferentially facing sides of the elements are provided with projections 46, 50 and grooves 48, 52 whereby the grooves and projections on one element can interdigitate with the grooves or projections on an adjacent element to cover the circumferential gap between the elements. Thus, whereas the circumferential gaps between the circumferential surfaces of adjacent elements prior to compression may be up to 5 mm or more, the gaps are substantially covered by the overlapping tongues 34 and projections/grooves 66-52 thereby preventing extrusion of the gasket it will be appreciated that the gap is never more than the width of the projections of grooves and hence is usually no more than about 1 mm, a gap sufficiently small to prevent extrusion of the gasket under normal conditions of use.

The gripping member 18 is disposed in the generally triangular recess 36 in the radially inner surface of the element. The gripping member 18 is generally wedge shaped in cross section and has a retaining stalk extending from the larger end of the wedge. The retaining stalk is relatively lightly held between the walls and gripping ridges of the slot 38 thereby preventing inadvertent dislodgement of the gripping member but is otherwise movable in an axial direction along the ramped surface 56 of the recess 36.

Figure 4:
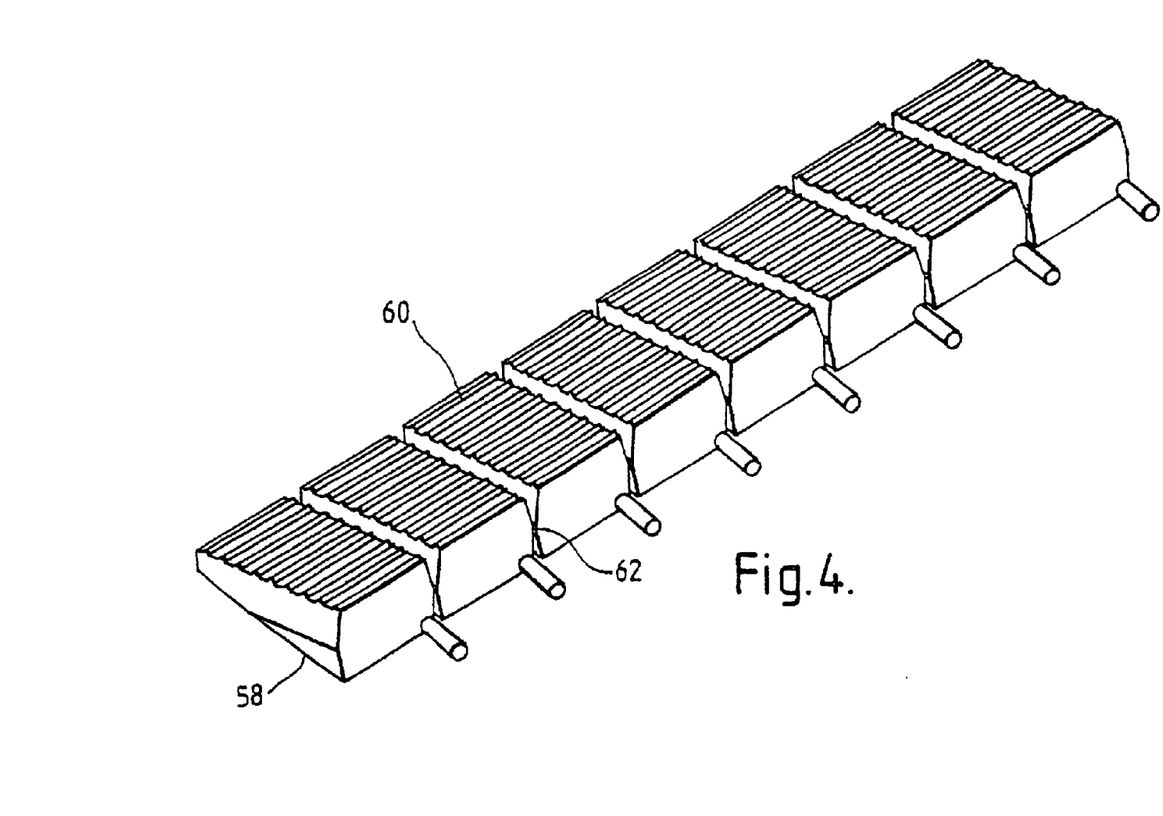
FIG. 4 is an isometric view of a gripping member.

The gripping member can be formed from a plastics material or a metal, and has a series of serrations on its radially inner gripping surface. In order to improve the gripping properties of the gripping surface, particularly with metal pipes, or pipes of a harder plastics material, the gripping surface is coated with an adhesively bonded layer of carborundum powder 54. Alternatively, or additionally, hardened metal gripping elements can be moulded into the gripping members or can be mounted in or on the surface thereof.

The gripping member can be provided as a single continuous annular member with a circumferential break to allow for radial contraction, or it can be provided in the form of a plurality of gripping segments each cooperating with a plurality of elements. Alternatively, the gripping members can be present as individual entities, one associated with each element The gripping members can be moulded in lengths and then cut to size, or they can be moulded to the desired length. Thus, as shown in FIG. 4, the gripping member can be formed as a series of segments 60 linked by hinge portions 62. Hinge portions 62 allow the gripping member to be bent to required radius of curvature and also provide a means of separating the individual segments if desired. The gripping member can be colour coded or provided with a protruding tag to enable the user to see that the gripping member is in place before assembling the joint.

In an alternative preferred embodiment, not shown, individual gripping members are provided, each gripping member being associated with a single element. The individual gripping members are hingedly linked together, preferably in a manner such that the circumferential gaps between them can be varied (i.e. reduced) under compression. Thus, the gripping members may be linked in a manner similar to the elements 20.

In order to assemble the gripping and sealing assembly, a plurality of the elements 20 are coupled together by slide fitting one to another to form an annular "bracelet" arrangement, and the gripping member(s) put in place. The detent ridges 30 and 32 defined them an intermediate or first detent location which holds the bulbous portion 24a of the tongue firmly in position during assembly and prior to compression. This first detent position serves to prevent inadvertent compression or contraction of the gripping means during carriage and routine handling. The gasket 14 is then attached to the annular carrier, the inner lip 14c being held within the slot 42 of each element The assembled gripping and sealing assembly can then be placed within the flared end 6 of the sleeve 4 and held in place by the compression flange 10 and compression bolts (not shown).

A pipe can be inserted into an end of the assembled coupling, the pipe end being inserted sufficiently far that it protrudes beyond the gripping and sealing assembly. In order to complete the joint, the flange bolts are tightened thereby drawing the two flanges together which has the effect of compressing the sealing and gripping assemblies between the compression flanges and the inclined surfaces of the flared ends of the sleeve. As the sealing and gripping assemblies are compressed, the annular carrier of connected elements is displaced radially inwardly towards the pipe such that the cylindrical portion of sealing gasket 14 seals against the pipe, and the gripping surface of the gripping member comes into gripping contact with the pipe. At the same time, the inclined portion of the sealing gasket is compressed between the axially inner side of the elements 20 and the inclined surface 6 of the flared end of the sleeve, thereby forming a seal between the sealing and gripping assembly and the sleeve.

As the sealing and gripping assembly is compressed, the individual elements 20, which have circumferential gaps between them prior to compression, are forced closer together in a circumferential direction, the net result of which is that the sealing and gripping assembly undergoes a radial contraction. As the elements move together, the bulbous portions 24a of the tongues 24, which sit between the detents 30 and 32 in the walls of the groove 28 in the first detent position prior to compression, are forced into the second detent position past the detent 32 towards the blind ends of the groove.

A particular advantage of the coupling of the present invention is that the presence of the separate axially movable wedge-shaped gripping member provides a more efficient and effective gripping action on the pipe. If an axial end load is applied to the pipe in a direction away from the coupling, retraction of the pipe from the coupling is prevented by the gripping ring. As will be appreciated from the drawings, if the pipe P is pulled in direction D away from the coupling, the gripping member will move with it, the result being that the inclined surface 58 of the gripping member will tend to cam along the ramped surface 56 of the recess thereby to urge the gripping member radially inwardly into even tighter gripping engagement with the pipe thereby preventing further movement.

A further advantage of the coupling and in particular the sealing and gripping means is that the gripping member is easily removable using no special tools. The coupling may therefore be used in situations where a gripping ring is considered unnecessary or undesirable.

Figure 8:
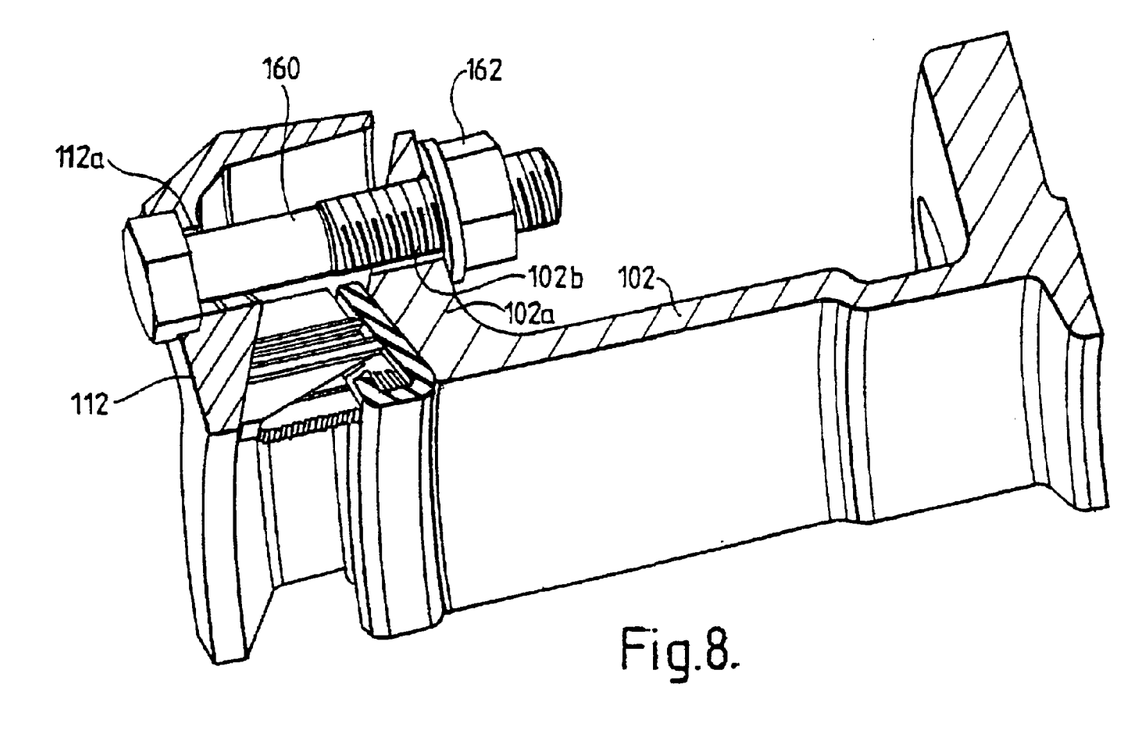
FIG. 8 is a partially sectioned isometric view of a pipe coupling according to a second embodiment of the invention.

The pipe coupling shown in FIG. 1 illustrates a coupling sleeve 2 in which the flange bolts extend from one end of the sleeve to the other, the bolts passing through apertures 12a in both flanges. However, in an alternative and preferred embodiment, as shown in FIG. 8, the sleeve 102 is provided with a flanged end 102a having apertures 102b that are aligned with apertures 112a in compression flange 112. Flange bolts 160 pass through the apertures and can be tightened by means of nuts 162 to draw the compression flange and sleeve together to compress the sealing and gripping assembly.

Figure 6:
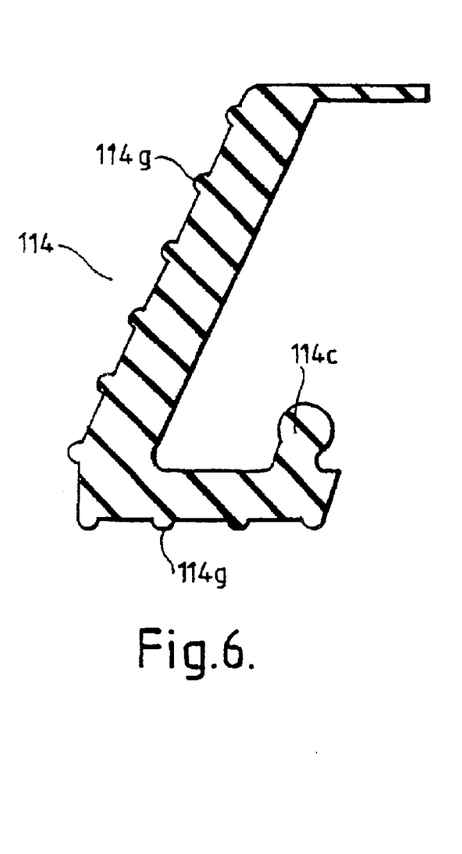
FIG. 6 a side sectional elevation of an alternative form of sealing gasket.

In a further preferred variation, as shown in FIG. 6, the sealing gasket 114 has ribs 114g to provide enhanced sealing ability and a bulbous ended lip 114c to assist retention in the groove 42 of the element 20.

It will readily be apparent that numerous modifications and alterations could be made to the pipe coupling device illustrated in the accompanying drawings without departing from the principles underlying this invention. All such modifications and alterations are intended to be embraced by this application.

What is claimed is:

1. A pipe coupling device comprising:
   a sleeve having an end configured to receive therein a plain end of a pipe and being provided with an annular first abutment surface;
   a compression member arranged to encircle the pipe and having an annular second abutment surface;
   a sealing and gripping assembly for sealing against and gripping the pipe; and
   means for drawing the compression member and the sleeve axially together so as to compress the sealing and gripping assembly between the first and second abutment surfaces thereby to deform or move the sealing and gripping assembly radially inwardly and into sealing and gripping engagement with the pipe;
   the sealing and gripping assembly comprising a sealing member and a gripping means, the gripping means comprising a radially contractable annular carrier, the radially contractable annular carrier having an annular recess on a radially inner side thereof, a gripping member being disposed within the annular recess, a gripping surface of the gripping member and the annular carrier being arranged for relative axial movement; the gripping member and annular recess being configured such that in response to the axial movement of the pipe, the gripping surface of the gripping member is moved radially inwardly and into tighter gripping contact with the pipe.

2. A pipe coupling device according to claim 1 wherein the annular carrier is formed from a plurality of linked elements.

3. A pipe coupling device according to claim 2 wherein the plurality of linked elements is closer together in a circumferential direction when the annular carrier is subjected to radial compression.

4. A pipe coupling device according to claim 2 wherein each element of the annular carrier has a single individual gripping member associated therewith.

5. A pipe coupling device according to claim 4 wherein the individual gripping members of the elements are hingedly linked together.

6. A pipe coupling device according to claim 5 wherein the individual gripping members are hingedly linked by a linkage having means for varying the circumferential distance between the individual gripping members.

7. A pipe coupling device according to claim 2 wherein, in order to prevent extrusion of the sealing member through circumferential gaps between the surfaces of the elements, the elements are provided with overlapping or interdigitating projections that serve to cover or at least reduce the circumferential gaps between the elements.

8. A pipe coupling device according to claim 2 wherein the elements are provided with first and second detent positions, a first detent position serving to hold the elements together and to being sufficient to prevent inadvertent compression and a second detent position to which the element can be compressed during use.

9. A pipe coupling device according to claim 8 wherein the elements are linked together by a tongue and groove arrangement or a ball and socket arrangement.

10. A pipe coupling device according to claim 1 wherein the annular recess is configured to provide an annular camming surface that cams against a radially outer surface of the gripping member to urge the gripping member radially inwardly against the pipe.

11. A pipe coupling device according to claim 10 wherein the gripping member is substantially wedge-shaped and the annular recess presents a ramped surface that cams along a radially outer inclined surface of the wedge shape of the gripping member to force the gripping member radially inwardly against the pipe.

12. A pipe coupling device according to claim 1 wherein the gripping member is formed from a plastics material.

13. A pipe coupling device according to claim 12 wherein the gripping surface is provided with serrations, ridges or other grip-enhancing protrusions.

14. A pipe coupling device according to claim 3 wherein the gripping surface is provided with grip-enhancing means having a greater hardness than the hardness of a main body of the gripping member itself.

15. A pipe coupling device according to claim 14 wherein the grip-enhancing means is selected from (i) one or more metallic gripping studs or protrusions on or in the gripping surface; (ii) an abrasive material embedded in or coated on to the gripping surface; and combinations thereof.

16. A pipe coupling device according to claim 1 wherein the gripping member comprises a plurality of segmented members arranged circumferentially around the pipe.

17. A pipe coupling device according to claim 1 wherein the gripping member and the annular recess are provided with cooperating retention means for preventing accidental dislodgment of the gripping member.

18. A pipe coupling device according to claim 1 wherein the gripping member is provided with means to assist a user to determine whether the gripping member is in place.

19. A combination of a pipe coupling device as defined in claim 1 and a pipe.

20. A method for coupling the end of a pipe to the pipe coupling device recited in claim 1 the method comprising:
   (a) placing the sleeve of the pipe coupling device over the end of a pipe; and
   (b) drawing the compression member and the sleeve axially together so as to compress the gripping means between the first and second abutment surfaces so as to deform or move the gripping means radially inwardly and in to sealing and gripping engagement with the pipe.

* * * * *